(12) United States Patent
Choi et al.

(10) Patent No.: US 8,441,604 B2
(45) Date of Patent: May 14, 2013

(54) LIQUID CRYSTAL DISPLAY HAVING CIRCULAR SHAPED PROTRUSIONS ON THE COMMON ELECTRODE

(75) Inventors: Youn-Seung Choi, Daejeon (KR); Jin-Ho Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/251,790

(22) Filed: Oct. 3, 2011

(65) Prior Publication Data

US 2012/0026438 A1 Feb. 2, 2012

Related U.S. Application Data

(62) Division of application No. 11/637,227, filed on Dec. 11, 2006, now Pat. No. 8,054,426.

(30) Foreign Application Priority Data

Dec. 12, 2005 (KR) ................................ 2005-122062

(51) Int. Cl.
*G02F 1/1343* (2006.01)
*G02F 1/1337* (2006.01)

(52) U.S. Cl.
USPC .......................................... 349/129; 349/141

(58) Field of Classification Search .................. 349/128, 349/129, 141
See application file for complete search history.

(56) References Cited

U.S. PATENT DOCUMENTS

| | | | |
|---|---|---|---|
| 6,927,824 B1 * | 8/2005 | Takeda et al. ................. | 349/129 |
| 2005/0078250 A1 * | 4/2005 | Chen et al. .................... | 349/129 |
| 2005/0128412 A1 | 6/2005 | Lee | |
| 2005/0162600 A1 * | 7/2005 | Rho et al. ..................... | 349/139 |
| 2005/0243231 A1 | 11/2005 | Horiguchi et al. | |
| 2006/0139540 A1 | 6/2006 | Lu et al. | |
| 2006/0238687 A1 * | 10/2006 | Su ................................. | 349/129 |

FOREIGN PATENT DOCUMENTS

| | | |
|---|---|---|
| CN | CM1702516 | 11/2005 |
| CN | 1704818 | 12/2005 |
| JP | 2004-205755 | 7/2004 |
| KR | 1999-0006951 | 1/1999 |

OTHER PUBLICATIONS

Office Action dated Dec. 4, 2009 for Chinese Patent Application No. 200810161948.
Office Action dated Mar. 19, 2007 for corresponding Korean Application No. 10-2005-0122062.

* cited by examiner

*Primary Examiner* — Jessica M Merlin
(74) *Attorney, Agent, or Firm* — Brinks Hofer Gilson & Lione

(57) ABSTRACT

A VA mode LCD device is disclosed, to improve the viewing-angle properties by isotropically compensating for a viewing angle, in which the VA mode LCD device includes first and second substrates; a plurality of gate and data lines formed on the first substrate, and formed perpendicularly to define a plurality of pixel regions. A thin film transistor is formed in each pixel region of the first substrate. A pixel electrode and a common electrode are formed in each pixel of the respective first and second substrates, wherein the pixel and common electrodes generate an electric field. At least one first slit of a curved-stripe shape, such as a circular-stripe shape, is formed in the pixel electrode of the first substrate. At least one second slit is formed in the common electrode of the second substrate. A liquid crystal layer formed between the first and second substrates.

5 Claims, 8 Drawing Sheets

LIQUID CRYSTAL DISPLAY HAVING CIRCULAR SHAPED PROTRUSIONS ON THE COMMON ELECTRODE

The present patent document is a divisional of U.S. patent application Ser. No. 11/637,227, filed Dec. 11, 2006, which claims priority to Korean Patent Application No. 122062/2005 filed in Korea on Dec. 12, 2005, which is hereby incorporated by reference.

BACKGROUND

1. Field of the Invention

The present invention relates to a vertical alignment mode liquid crystal display (LCD) device, and more particularly, to a vertical alignment mode LCD device in which an electric field is used to improve the viewing-angle properties.

2. Discussion of the Related Art

Recently with the development of various mobile electronic devices, for example, mobile phones, PDAs, notebook computers, and etc., there has been the increasing demand for flat panel display devices with a thin profile and that are lightweight These flat panel display devices maybe, for example, s a liquid crystal display (LCD), a plasma display panel (PDP), a field emission display (FED), and a vacuum fluorescent display (VFD). The LCD device, in particular, has drawn a great amount of attentions due to the advantageous properties of its mass-production technology, the high picture quality and the good mobility.

The LCD device includes a thin film transistor array substrate; a color filter substrate; and a liquid crystal layer. The thin film transistor array substrate and the color filter substrate are provided opposite to each other, are bonded to each other, and the liquid crystal layer is formed between the two substrates.

The thin film transistor array substrate includes a plurality of pixels arranged in a matrix configuration, wherein each pixel includes a thin film transistor, a pixel electrode and a capacitor. The color filter substrate includes a common electrode; an RGB color filter, which represent various colors; and a black matrix. The common electrode and the pixel electrode apply the electric field to the liquid crystal layer.

An alignment layer having an alignment controlling force is formed on each of facing surfaces of the two substrates, whereby liquid crystal molecules of the liquid crystal layer are aligned in a predetermined direction.

If the electric field is formed between the pixel electrode, formed in each pixel of the thin film transistor array substrate, and the common electrode, formed on an entire surface of the color filter substrate, the aligned liquid crystal molecules are rotated by the dielectric anisotropy. As light is transmitted or blocked by each pixel, letters or images are displayed. This is referred to as the Twisted Nematic (TN) mode, wherein the images are displayed by the operation of the liquid crystal molecules. However, the TN mode LCD device has the disadvantages of having a narrow viewing angle due to the refractive anisotropy of the liquid crystal molecule.

In the TN mode LCD device, the light transmittance is symmetrically distributed in the horizontal direction of the viewing angle. However, the light transmittance is asymmetrically distributed in the vertical direction of the viewing angle. Thus, the inverted image may occur in the vertical direction of the viewing angle due to the asymmetric distribution of the light transmittance in the vertical direction. As a result, the viewing angle becomes narrow.

To overcome this problem of the narrow viewing angle, a multi-domain LCD device has been proposed, for example, a two-domain TN (TDTN) mode or a domain divided TN (DDTN) mode, wherein each pixel is divided into at least two domains, of which main viewing angles are different from each other, to thereby compensate for the viewing angle.

However, for the multi-domain LCD device it is necessary to perform a rubbing process to each domain, so as to obtain the different alignment directions of the liquid crystal molecules in the respective domains. For example, for the two-domain LCD device, the rubbing process is performed to the first domain after blocking the second domain by depositing a photoresist layer on the second domain of the alignment layer, thereby forming the alignment controlling force of the first direction. Then, after removing the photoresist layer from the second domain, another photoresist layer is formed in the first domain, and the second domain is rubbed, to provide the alignment controlling force of the second direction. After rubbing the second domain, the photoresist layer is removed from the first domain by a development process.

For the above-mentioned multi-domain LCD device, one pixel (that is, one substrate) is rubbed by two photolithography processes using the photoresist, thereby increasing the fabrication cost and complicating the process. Also, the development process for the photoresist may have adverse effects on the alignment layer, whereby the picture quality of the LCD device may deteriorate.

To overcome this problem with the multi-domain LCD device, which has a wide-viewing angle structure, a vertical alignment (VA) mode LCD device has been proposed. If a voltage is not applied to the VA mode LCD device, a major axis of liquid crystal molecule is aligned vertically to the alignment layer. If the voltage is applied to the VA mode LCD device, the axis of the liquid crystal molecules is moved to the horizontal direction of the alignment layer since the liquid crystal molecules, which have a negative-type dielectric anisotropy are aligned slantwise by the electric field, so that the light is transmitted through the liquid crystal layer.

In comparison with the TN mode LCD device, the VA mode LCD device has a high contrast ratio and rapid response speed. Furthermore, the VA mode LCD device can realize a wide viewing angle if the alignment direction of the liquid crystal molecules are divided into the various directions and a compensation film is used.

However, it is difficult to align the major axis of liquid crystal molecule perfectly vertical to the alignment layer. Also, the liquid crystal molecule is rotated to one direction. Thus, a color shift may occur according to the viewing angle by the refractive anisotropy of liquid crystal. In order to overcome this problem, a multi-domain VA mode LCD device, which is provided with a pixel including a plurality of domains, has been widely used so that it is possible to compensate for the viewing angle, thereby improving the viewing-angle properties.

FIG. 1A illustrates a related art multi-domain VA mode LCD device. The related art multi-domain VA mode LCD device is provided with a plurality of pixels. However, for convenience of explanation, only one unit pixel will be described as follows.

As shown in FIG. 1A, a pixel is defined by a gate line 1 and a data line 2, wherein the pixel is divided into a plurality of domains. In the plurality of domains, liquid crystal molecules are aligned at the different directions. Thus, the main viewing angle of the domains compensate each other, whereby the viewing-angle properties improve.

Then, a thin film transistor 3 is formed adjacent to a crossing of the gate line 1 and the data line 2, wherein the gate line 1 is supplied with a scanning signal from an external driving circuit, and the data line 2 is supplied with a video signal from the external driving circuit. The thin film transistor 3 is comprised of a gate electrode 4; a semiconductor layer 5 formed on the gate electrode 4; a source electrode 6 and a drain electrode 7. In this state, as the gate electrode 4 is connected with the gate line 1, the scanning signal of the gate line 1 is applied to the gate electrode 4. Also, the semiconductor layer 5 is activated according as the scanning signal is applied to the gate electrode 2. The source and drain electrodes 6 and 7 are formed above the semiconductor layer 5.

Also, the pixel is provided with a pixel electrode 10 connected with the drain electrode 7. That is, as the semiconductor layer 5 becomes activated, the video signal is applied to the pixel electrode 10, whereby the pixel electrode 10 drives liquid crystal (not shown). Also, a common electrode 38 is formed opposite to the pixel electrode 10, thereby forming an electric field therebetween.

The pixel electrode 10 is provided with two of first slits 29, and the common electrode 38 is provided with a second slit 39, wherein the second slit 39 is positioned between the first slits 29 of the pixel electrode 10.

The related art multi-domain VA mode LCD device will be explained in more detail with reference to FIG. 1B.

Referring to FIG. 1B, the related art multi-domain VA mode LCD device includes a first substrate 20, a second substrate 30, and a liquid crystal layer 40 formed between the first and second substrates 20 and 30.

The first substrate 20 includes a gate insulation layer 22; a data line 2 formed on the gate insulation layer 22; a passivation layer 24 formed on the gate insulation layer 22 above the data line 2; and a pixel electrode 10 of a transparent conductive material formed on the passivation layer 24.

The second substrate 30 includes a black matrix 32 which prevents light from being transmitting through a non-display area such as the thin film transistor 3; a color filter layer 34 of red (R), green (G) and blue (B), which represent colors; and a common electrode 38 formed on the color filter layer 34. As the video signal is applied to the multi-domain VA mode LD device, an electric field is formed between the pixel electrode 10 and the common electrode 38.

As shown in FIG. 1B, a second slit 39 is formed in the common electrode 38 of the second substrate 30, whereby the pixel is divided into a plurality of domains. Also, two of first slits 29 are formed in the pixel electrode 10 of the first substrate 20. At this time, the first slits 29 of the pixel electrode 10 are positioned at both sides of the second slit 39 of the common electrode 38, whereby the electric field (E) is distorted between the pixel electrode 10 and the common electrode 38. That is, as show in FIG. 1, the electric field, formed between the pixel electrode 10 and the common electrode 38, is symmetrically formed with respect to the second slit 39 of the common electrode 38 due to the slits 29 and 39. Accordingly, the liquid crystal molecules are symmetrically aligned by the second slit since the liquid crystal molecules are aligned aslant along the electric field. As a result, the liquid crystal molecules are symmetrically aligned in the adjacent domains of the pixel.

To improve the viewing-angle properties in the horizontal direction as well as in the vertical direction, each of the first and second slits 29 and 39 is arranged at an angle of about 45°.

The related art multi-domain VA mode LCD device can improve the viewing-angle properties of a pixel provided with the plurality of domains, but it has the following disadvantages.

As shown in FIG. 2A, the general LCD device is provided with RGB pixels. Recently, a pixel structure including RGBW pixels to improve the luminance and color realization ratio has been proposed, as shown in FIG. 2B.

The LCD device that includes the RGB pixels has a low luminance because most of the light is absorbed in a RGB color filter layer. On the other hand, the light-absorbing ratio can be decreased by changing the pixel structure to the RGBW pixels, whereby the luminance improves. The LCD device using the RGBW pixels includes a pixel having a white (W) color filter layer, which transmits most of light emitted from a backlight unit, whereby the luminance improves.

In the LCD device using the RGB pixel structure, each pixel is formed in shape of a rectangle. In contrast, in case of an LCD device using the RGBW pixel structure, each pixel is formed in shape of a square. For the LCD device using the RGBW pixel structure, each slit provided in the pixel and common electrodes is not formed at an angle of about 45°, so that it is impossible to compensate for the viewing angle in the horizontal and vertical directions, thereby causing the color shift.

BRIEF SUMMARY

An LCD device is disclosed comprising first and second substrates; a plurality of gate and data lines formed on the first substrate, and formed perpendicularly to define a plurality of pixel regions. A thin film transistor is formed in each pixel region of the first substrate. A pixel electrode and a common electrode are formed in each pixel of the respective first and second substrates. The pixel and common electrodes generate an electric field. At least one first slit of a curved—stripe shape is formed in the pixel electrode of the first substrate. At least one second slit is formed in the common electrode of the second substrate. A liquid crystal layer is formed between the first and second substrates. In one preferred embodiment, the curved stripe shape is a circular-stripe shape.

In another aspect of the invention, a second slit is formed in the central portion of the circular-stripe shaped first slit.

In another aspect of the present invention, an LCD device comprises first and second substrates; a plurality of gate and data lines formed on the first substrate, and formed perpendicularly to define a plurality of pixel regions. A thin film transistor is formed in each pixel region of the first substrate. A pixel electrode and a common electrode are formed in each pixel of the respective first and second substrates, wherein the pixel and common electrodes generate an electric field. At least one protrusion of a circular-stripe shape is formed below the common electrode of the second substrate. At least one slit is formed in the pixel electrode of the first substrate. A liquid crystal layer is formed between the first and second substrates.

The foregoing and other features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE DRAWINGS AND THE PRESENTLY PREFERRED EMBODIMENTS

Reference will now be made in detail to the preferred embodiments of the present invention, examples of which are illustrated in the accompanying drawings.

Figure 1A:
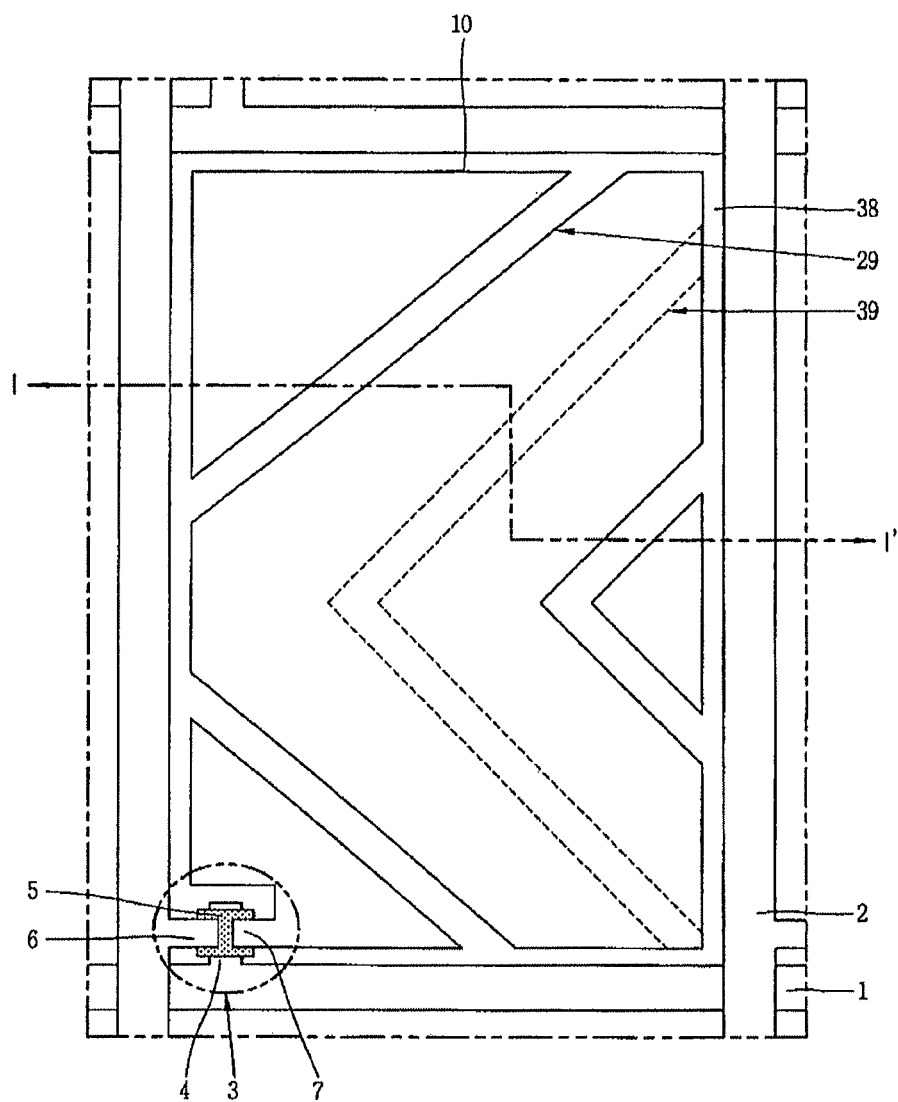
FIG. 1A is a plan view of illustrating a related art VA mode LCD device.
Figure 1B:
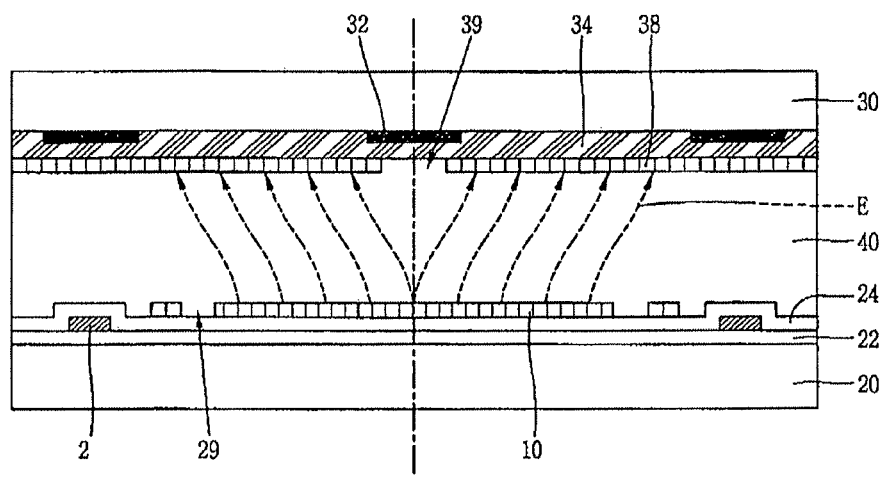
FIG. 1B is a cross section view along I-I' of FIG. 1A.
Figure 2A:
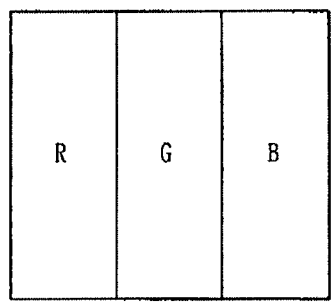
FIG. 2A is a view of illustrating a RGB pixel structure.
Figure 2B:
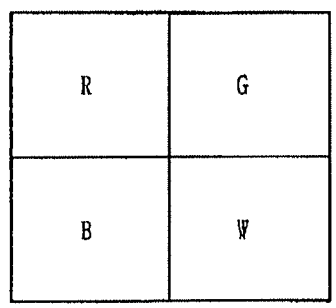
FIG. 2B is a view of illustrating a RGBW pixel structure.
Figure 3:
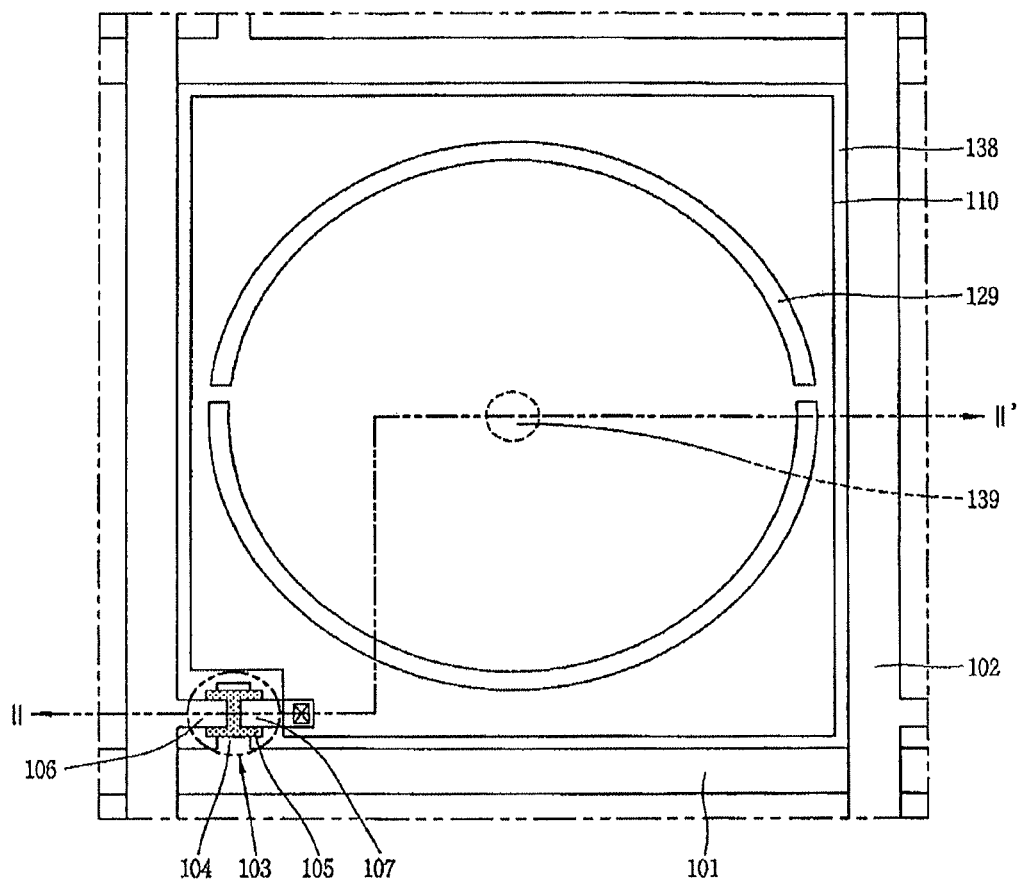
FIG. 3 is a plan view of illustrating a VA mode LCD device according to one preferred embodiment of the present invention.

FIG. 3 is a plan view of illustrating a VA mode LCD device according to one preferred embodiment of the present invention.

As shown in FIG. 3, the VA mode LCD device according to one preferred embodiment of the present invention includes a plurality of pixels defined by a plurality of gate and data lines 101 and 102 Each gate line 101 is supplied with a scanning signal from an external driving circuit, and each data line 102 is supplied with a video signal from the external driving circuit. A thin film transistor 103 is formed adjacent to each crossing of the gate and data lines 101 and 102. The thin film transistor 103 is comprised of a gate electrode 104; a semiconductor layer 105 formed on the gate electrode 104; a source electrode 106 and a drain electrode 107 formed on the semiconductor layer 105. The gate electrode 104 is connected with the gate line 101, the scanning signal of the gate line 101 is applied to the gate electrode 104. Also, the semiconductor layer 105 is activated as the scanning signal is applied to the gate electrode 102. The source and drain electrodes 106 and 107 apply the video signal to the pixel.

Also, the pixel is provided with a pixel electrode 110 connected with the drain electrode 107. That is, as the semiconductor layer 105 becomes activated, the video signal is applied to the pixel electrode 110 through the source and drain electrodes 106 and 107, whereby the pixel electrode 110 drives liquid crystal (not shown). Also, a common electrode 138 is formed in opposite to the pixel electrode 110. As the video signal is applied to the pixel electrode 110, an electric field is formed between the pixel electrode 110 and the common electrode 138, whereby the liquid crystal molecules are driven by the electric field.

A first slit 129 is formed in the pixel electrode 110 of the pixel, wherein the first slit 129 has a curved shape, for example a circular stripe shape. A second slit 139 is formed in the common electrode 138 corresponding to the central portion of the first slit 129 having the circular-stripe shape. The first and second slits 129 and 139 distort the electric field formed between the pixel electrode 110 and the common electrode 138, whereby the entire pixel is formed isotropically to compensate for the viewing angle. This VA mode LCD device will be explained with reference to FIGS. 4A and 4B.

Figure 4A:
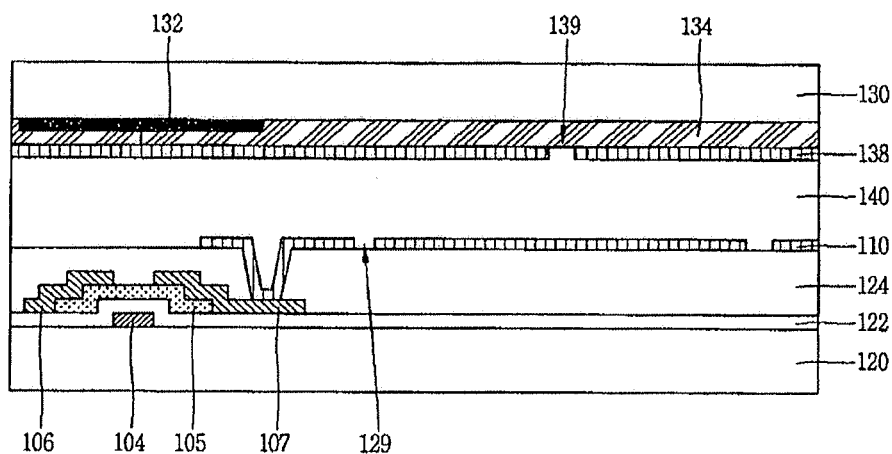
FIG. 4A is a cross section view along II-II' of FIG. 3.

FIG. 4A is a cross section view along II_II' of FIG. 3. As shown in FIG. 4A, the gate electrode 104 is formed on a first substrate 120, wherein the first substrate 120 is formed of a transparent material, for example, glass. A gate insulation layer 122 is formed on an entire surface of the first substrate 120, and the semiconductor layer 105 is formed on the gate insulation layer 122. The source and drain electrodes 106 and 107 are formed on the semiconductor layer 105. In this case, if the scanning signal is inputted to the gate electrode 104 through the gate line 101, the semiconductor layer 105 becomes activated, thereby forming a channel region. By forming the channel region, the signal inputted to the source electrode 105 through the data line 102 is transmitted to the drain electrode 107.

A passivation layer 124 is formed on the entire surface of the first substrate including the source and drain electrodes 106 and 107, and the pixel electrode 110 is formed thereon. The pixel electrode 110 is formed of a transparent conductive material, for example, Indium Tin Oxide (ITO) or Indium Zinc Oxide (IZO). The pixel electrode 110, formed by sputtering or evaporation, is electrically connected with the drain electrode 107 through a contact hole formed in the passivation layer 124.

The first pixel electrode 110 is provided with the first slit 129. As shown in FIG. 3, the first slit 129 is formed in a circular-stripe shape within the pixel. The first slit 129 is not in a perfect circular shape. That is, at least one portion connects the inside of the circular stripe of the first slit 129 with the pixel electrode 110, whereby the video signal is smoothly applied to the entire pixel electrode 110.

The second substrate 130 includes a black matrix 132 which prevents light from being transmitted through a non-display area having the thin film transistor 103; a color filter layer 134 of red (R), green (G), blue (B) and white (W) (or, RGB) formed corresponding to each pixel, to represent colors; and the common electrode 138 formed on the color filter layer 134 opposite to the pixel electrode 110 of the first substrate 120. As the video signal is applied to the pixel electrode 110, the electric field is formed between the pixel electrode 110 and the common electrode 138.

The common electrode 138 includes the second slit 139, wherein the second slit 139 is positioned in the central portion of the first slit 129 having the circular-stripe shape.

As described above, the circular-stripe shaped first slit 129 is formed in the pixel electrode 110 of the first substrate 120, and the second slit 139 is formed in the common electrode 138 corresponding to the central portion of the first slit 129, thereby distorting the electric field formed between the pixel electrode 110 and the common electrode 138. In the related art VA mode LCD device, the liquid crystal molecules of the liquid crystal layer 140 are aligned by a fixed angle from the first substrate 120 to the second substrate 130. In the VA mode LCD device according to the disclosed embodiment, the electric field is isotropically formed with respect to the second slit 139 of the second substrate 130, whereby the liquid crystal molecules are aligned by a predetermined angle along the circle with respect to the second slit 139.

Figure 4B:
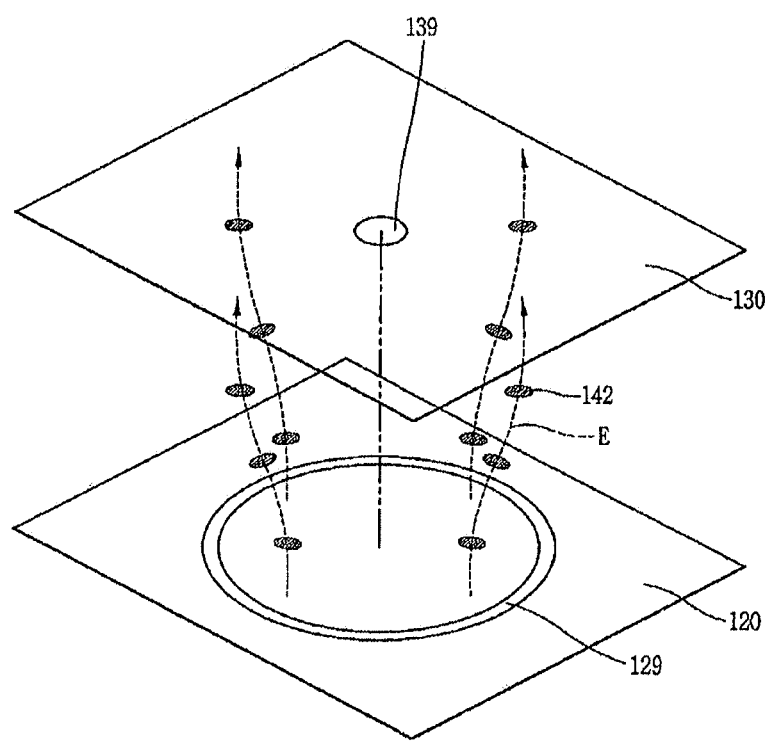
FIG. 4B is a perspective view conceptionally illustrating the alignment of liquid crystal molecules in a VA mode LCD device of FIG. 3.

FIG. 4B illustrates the electric field and the alignment of liquid crystal molecules in the VA mode LCD device according to the illustrated embodiment of the present invention. As shown in FIG. 4B, when the electric field (E) is formed between the first and second substrates 120 and 130, the electric field (E) is not formed in perpendicular to the planes of the first and second substrates 120 and 130, but formed aslant by the predetermined angle from the first substrate 120 to the second substrate 130. Since the angle of the electric field is isotropically formed with respect to the second slit 139, the liquid crystal molecules 142 are aligned aslant by the predetermined angle with respect to the electric field (E).

Thus, the liquid crystal molecules 142 are isotropically aligned with respect to the second slit 139. Accordingly, it is possible to isotropically compensate for the viewing angle within the pixel, so that the viewing-angle properties improve in all directions. As a result, it is possible to prevent a color shift from occurring on the change of viewing angle.

Figure 5A:
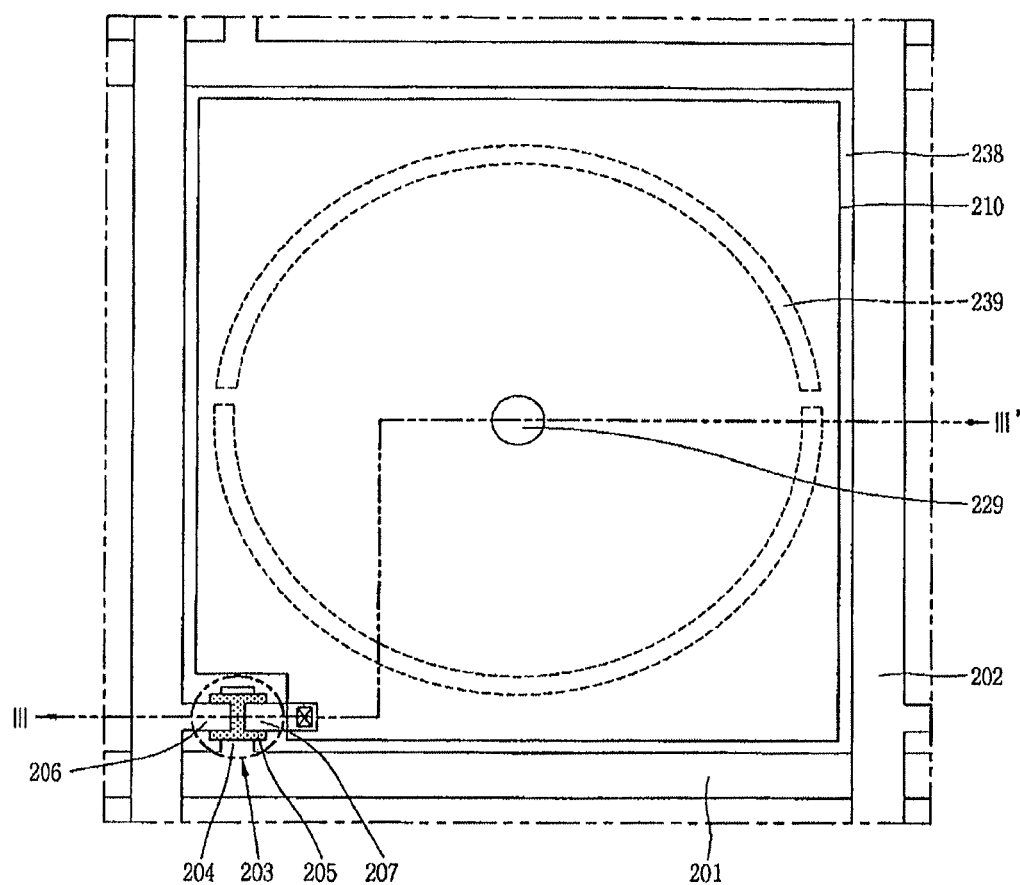
FIG. 5A is a plan view of illustrating a VA mode LCD device according to another preferred embodiment of the present invention.
Figure 5B:
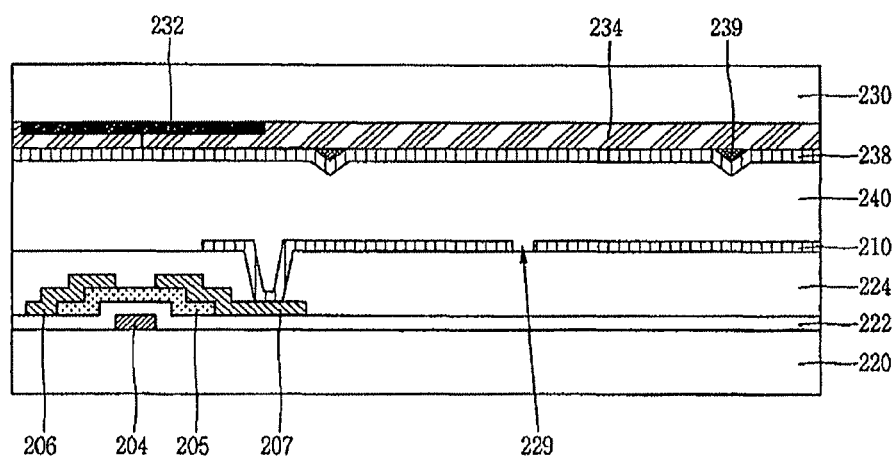
FIG. 5B is a cross section view along III-III' of FIG. 5A.

FIG. 5 illustrates a VA mode LCD device according to another preferred embodiment of the present invention. Except an structure of distorting the electric field, the VA mode LCD device of FIG. 5 is similar in structure to the VA mode LCD device of FIG. 4. Thus, the detailed explanation for the VA mode LCD device of FIG. 5 will be omitted, and the difference between the two VA mode LCD devices will be explained in detail. FIG. 5A is a plan view of illustrating a VA mode LCD device according to another preferred embodiment of the present invention, and FIG. 5B is a cross section view along of FIG. 5A.

For the VA mode LCD device, as shown in FIG. 5, a circular-stripe shaped protrusion 239 is formed on a second substrate 230, and a slit 229 is formed in a pixel electrode 210 of a first substrate 220. A common electrode 238 is formed on the protrusion 239 of the second substrate 230, whereby the common electrode 238 is formed in the protruding shape, thereby distorting the electric field. Also, the slit 229, formed in the pixel electrode 219, is positioned corresponding to the central portion of the circular-stripe shaped protrusion 239. Accordingly, when forming the electric field between the pixel electrode 210 and the common electrode 238, the electric field is isotropically formed with respect to the slit 229. As a result, the liquid crystal molecules arranged along the electric field are also isotropically aligned with respect to the slit 229, to thereby compensate for the viewing angle.

The VA mode LCD device according to the disclosed embodiments of the present invention includes a slit or protrusion formed on the first and second substrates. Accordingly, the electric field applied to the liquid crystal layer is formed isotropically, so as to improve the viewing-angle properties in all directions.

In the VA mode LCD devices of FIGS. 3 to 5, each pixel of the first and second substrates includes one slit or protrusion. However, other embodiments are not limited to this arrangement. The present invention may be applied to a VA mode LCD device which includes each pixel provided with a plurality of domains by a plurality of slits or protrusions.

Figure 6A:
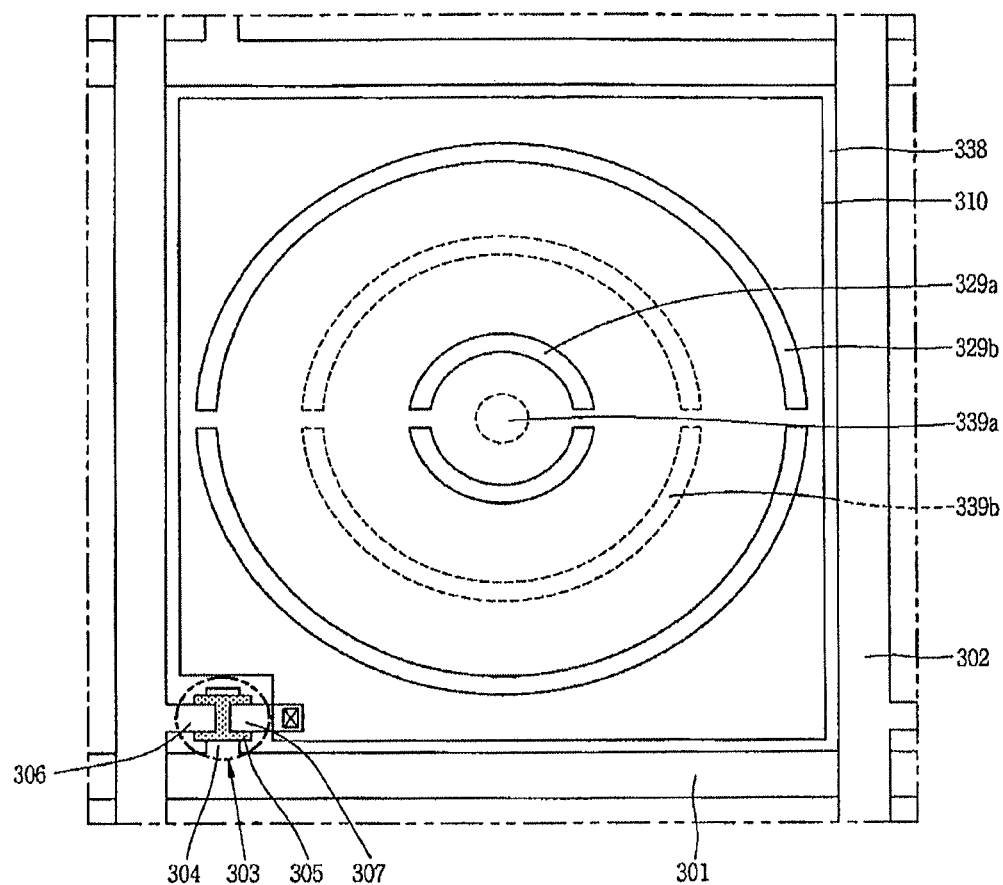
FIGS. 6A and 6B are plan views of illustrating a structure of a VA mode LCD device according to another preferred embodiment of the present invention.

As shown in FIG. 6A, a plurality of slits 329a and 329b are formed in a pixel electrode 310, wherein each slit is formed in shape of a circular stripe. Also, an island-shaped slit 339a and a circular-stripe shaped slit 339b are formed in a common electrode 338. At this time, each slit 329a and 329b of the pixel electrode 310 alternates with each slit 339a and 339b of the common electrode 338, whereby the pixel is divided into the plurality of domains. Because of the slits 329a, 329b, 339a and 339b, the electric field is isotropically formed in the liquid crystal layer, whereby the viewing-angle properties improve in the vertical and horizontal directions (that is, isotropic).

Figure 6B:
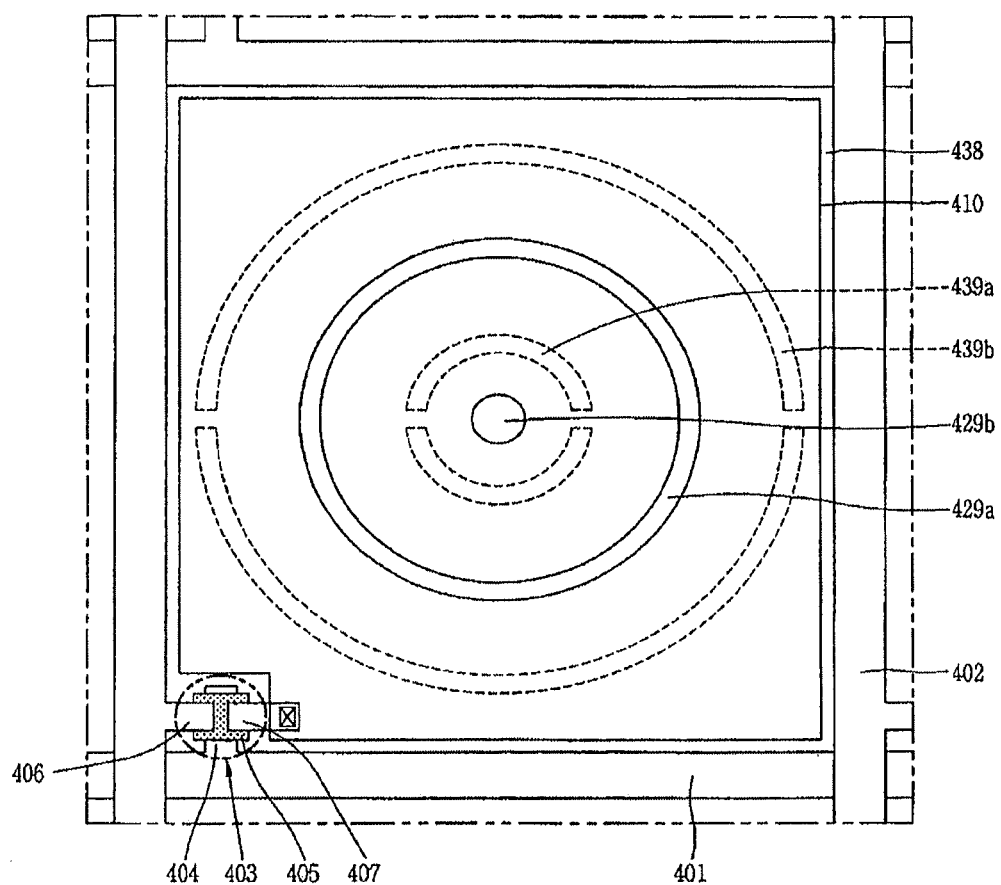

As shown in FIG. 6B, a plurality of slits 429a and 429b are formed in a pixel electrode 410, wherein the slits 429a and 429b may be formed in shapes of an island and a circular stripe. Also, a circular-stripe shaped protrusion in formed in a common electrode 438. Each slit 429a and 429b of the pixel electrode 410 alternates with each slit 439a and 439b of the common electrode 438, whereby the pixel is divided into the plurality of domains. Because of the slits 429a, 429b, 439a and 439b, the electric field is formed isotropically, whereby the viewing-angle properties improve in the vertical and horizontal directions (that is, isotropic).

In the VA mode LCD devices of FIGS. 6A to 6B, each pixel of the first and second substrates includes two slits or protrusions. However, other embodiments are not limited to this arrangement. The present invention may be applied to a VA mode LCD device which includes each pixel provided with three slits or protrusions or more.

The present invention may be applied to the pixel structure including the RGBW pixels. However, the present invention may also be applied to the pixel structure including the RGB pixels. In this case, the slit or protrusion may be formed in shape of an ellipse based on the rectangular-shaped pixel.

As mentioned above, the VA mode LCD device according to the present invention has the following advantages.

In the VA mode LCD device according to the present invention, the circular-stripe shaped slit or protrusion is formed in the substrate, whereby the electric field applied to the liquid crystal layer is distorted isotropically. As a result, the liquid crystal molecules are aligned isotropically, so that it is possible to compensate for the viewing angle in all directions, thereby improving the viewing-angle properties.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A liquid crystal display device comprising:
first and second substrates;
a plurality of gate and data lines on the first substrate to define a plurality of pixel regions;
a thin film transistor in each pixel region of the first substrate;
a black matrix on the second substrate;
a color filter layer on the second substrate;
a pixel electrode and a common electrode in each pixel region of the respective first and second substrates;
at least one protrusion of a curved-stripe shape below the common electrode of the second substrate;
at least one slit in the pixel electrode of the first substrate; and
a liquid crystal layer between the first and second substrates,
wherein the protrusion having a flat surface and a protruding surface, the flat surface of the protrusion being contacted with the color filter and the common electrode is disposed on the protruding surface of the protrusion,
wherein the protrusion is formed in a circular-stripe shape having the predetermined width on the second substrate and the slit is formed at a region of the first substrate corresponding to a central region of the circular shape of the protrusion of the second substrate, thereby an isotropic electric field is generated between the first and second substrates by the protrusion and slit.

2. The liquid crystal display device of claim 1, wherein the slit is formed at a region corresponding to the central portion of an area surrounded by the circular-stripe shaped protrusion.

3. The liquid crystal display device of claim 2, wherein a plurality of slits and protrusions are formed in the first and second substrate respectively.

4. The liquid crystal display device of claim 3, wherein the slits and protrusions are arranged alternately.

5. The LCD device of claim 1, wherein the color filter layer includes red(R), green(G), blue(B) and white(W) color filter patterns.

* * * * *